Jan. 13, 1948.  E. O. LONZE  2,434,501

WHEEL CONSTRUCTION

Filed Jan. 8, 1946

INVENTOR.
ERVIN O. LONZE

BY Christian R. Nielsen
ATTORNEY.

Patented Jan. 13, 1948

2,434,501

UNITED STATES PATENT OFFICE 2,434,501

WHEEL CONSTRUCTION

Ervin O. Lonze, Chicago, Ill., assignor to Era Tool and Engineering Company, Chicago, Ill., a corporation Application January 8, 1946, Serial No. 639,818

2 Claims. (Cl. 301—5.7)

My invention relates to wheel construction, and more particularly to a wheel adapted for use on roller skates or the like.

The object of my invention is to provide a means of constructing and assembling a ball bearing type of wheel, in a manner in which all the component parts constituting the wheel are pressed into position, and held in proper alignment with one another by frictional contact.

Another object of my invention is to construct the parts in such manner that they will be interchangeable for engagement, one with the other.

A still further object of my invention is to construct the parts constituting the finished product in a manner to permit their assembly with the use of simple tools and without the use of special equipment, thereby providing an inexpensive efficient and serviceable device.

Other and further objects of my invention will become more apparent as the description proceeds when taken in conjunction with the drawings, in which.

Figure 7:
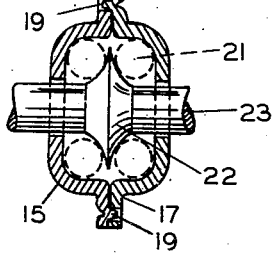
Figure 7 is a fragmentary, cross-sectional view of the assembled cups, balls and axle equipped with a ball race.

Similar characters of reference indicate corresponding parts throughout the several views, and referring now to the same, the character 15 shows a ball cup provided with an aperture 16 at its center, and a flange 17 at its peripheral edge. The flange 17 is provided with a plurality of inwardly extending slots 18 leading toward the body of the cup 15. There is an outwardly extending pin 19 formed integrally with and projecting from the flange 17, and directly opposite from the pin 19 is an aperture 20 extending through the flange 17. This aperture 20 is of a size to accommodate the pin 19 when the two cups 15 are placed in contact with one another, as shown in Figure 7, and having the pin 19 of one cup entering the aperture 20 of the other cup. The combination of the two cups 15, as shown in Figure 7, permit the insertion of ball bearings 21, shown in phantom, against a ball race 22 shown constructed integrally with a shaft 23.

The side plates 24 of annular contour are provided with a cone portion 25 and an outwardly extending flange 26 which extends rearwardly from the face toward the direction of the cone 25. The cone portion 25 is provided with an aperture 27 and has outwardly extending members or keys 28 integrally formed, and a corresponding number of indented slots 29 spaced in proper relation therewith.

The keys 28 are of a width to correspond with the width of the slots 29 on the flange 26 of the plates 24 and the slots 18 of the cup members 15.

Figure 3:
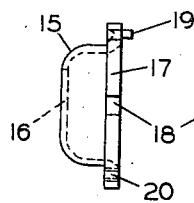
Figure 3 is a side view of one of the ball cups, illustrating the manner in which a projecting pin and aperture are pressed or formed integral with the cup.
Figure 4:
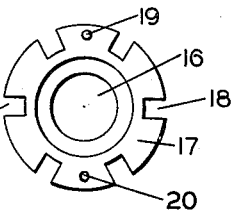
Figure 4 is a front or plan view of the device, as shown in Figure 3.
Figure 5:
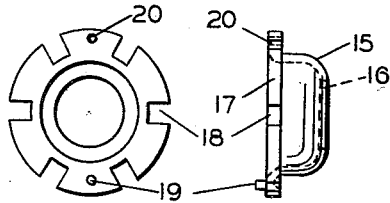
Figure 5 is a plan or front view of a similar cup, as shown in Figures 3 and 4, but with the pin and aperture positioned in opposite relation to Figure 4.
Figure 6:
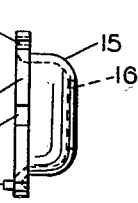
Figure 6 is a side view of the cup, shown in Figure 5.
Figure 1:
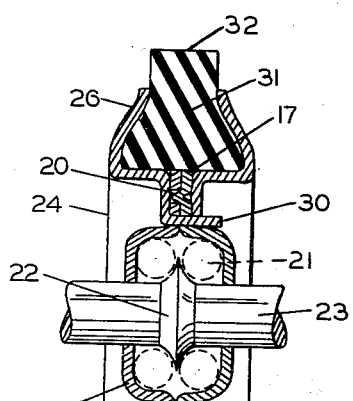
Figure 1 is a fragmentary, cross-sectional, enlarged view of the assembled device having the component parts pressed into engagement with one another.
Figure 2:
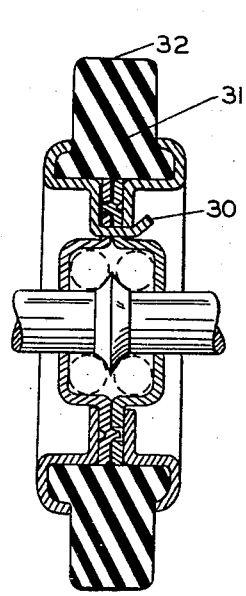
Figure 2 is a similar view showing the method of locking all of the parts into a fixed position.
Figure 8:
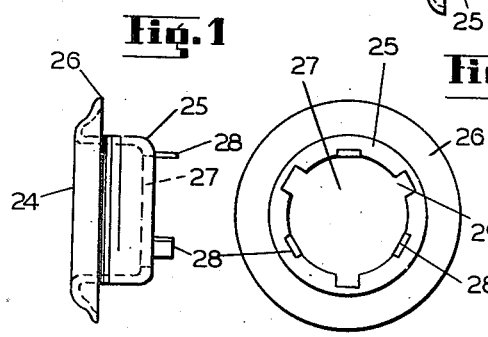
Figure 8 is a side view of the assembled cups and side plates, with the axle shown in phantom.
Figure 9:
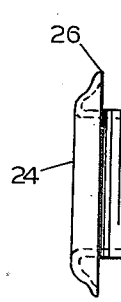
Figure 9 is a side view of the annular side plate, showing the projecting key members extending outward therefrom.
Figure 10:
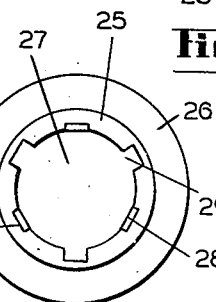
Figure 10 is a front or plan view of the device, as shown in Figure 9.
Figure 11:
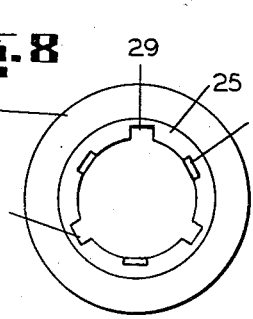
Figure 11 is a similar plan view of the side plate, but showing the key members arranged for engagement with the side plate, as shown in Figure 10.
Figure 12:
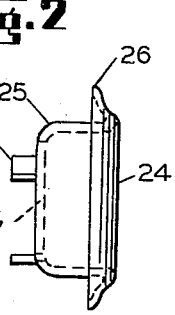
Figure 12 is an end view of the plate as shown in Figure 11.

In Figures 1 and 2, I show an enlarged assembly of the various parts with the shaft 23 and showing the ball bearings 21 in phantom. The plates 24, when placed in a manner whereby the cones 25 are adjacent to one another, permit the engagement of the keys 28 with the slots 29 of the plates 24 and the slots 18 of the cups 15, and when proper contact of the various members is made over the bearings 21 the ends 30 of the members or keys 28 may be forced upward away from the cup 15, thereby locking the entire unit, as shown in Figure 2.

The two side plates 24 are shown supporting an annular tire or rim 31 of wood, rubber or plastic material, by means of the flanges 26, thereby providing a resilient peripheral surface 32 for the assembled wheel.

It is manifest to anyone familiar with the art that the construction and design of the various parts permit their interchangeable use. There are no right or left hand parts. All parts correspond with and engage one another. The pin 19 and the aperture 20 permit engagement of the identical cup members 15. The slots 29 in the plates 24 register with one another in a manner to permit the keys 28 to be inserted into the slots 29 of the plates 24, and the slots 18 in the flange 17 of the cup members 15. The aperture 16 of the cups 15 engage the shaft 23 while the apertures 27 of the flange 24 engage the outer periphery of the cups 15, and the keys 28 are of a length sufficient to permit their being locked, as shown in Figure 2, to retain the various parts in an assembled position.

The assembly of the entire unit is accomplished without the use of welding or machine operations, and while I have shown a specific structure and arrangement of the various parts constituting the device, I am fully cognizant of the fact that many variations may be made in their contour without in any way effecting the efficiency and operation of the finished product, and I reserve the right to make such changes as I may deem convenient or necessary, without departing from the spirit of my invention or the scope of the appended claims.

Having thus described my invention, what I claim and desire to secure by Letters Patent in the United States is:

1. A device of the character described, in combination with a shaft having a ball race to accommodate ball bearings, said device comprising a pair of hollow ball cups provided with outwardly extending flanges equipped with inwardly extending slots, a pair of annular plates, said plates provided with cones and outwardly extending flanges, said ball cups provided with centrally disposed apertures for engagement with said shaft, said plates provided with centrally disposed apertures for engagement with the outer periphery of said ball cups, the cones of said plates having slots extending from the apertures in said cones, said plates further provided with outwardly extending keys, said keys registering with and engaging said slots in said ball cups and the slots in said plates, and of a length sufficient to enable the outwardly depending ends of said keys to be spread apart for locking said ball cups within the cones of said plates, and a resilient annular ring member placed between the flanges of said plates, said ring member of a diameter greater than the outer diameter of said plates.

2. A device of the character described to be used in combination with a shaft having a ball race and a plurality of ball bearings, said device comprising a pair of ball cups provided with outwardly extending flanges, said flanges provided with inwardly extending slots, engaging means for retaining said ball cups in engagement with one another when the flanges of said cups are placed in contact with one another, a pair of annular plates, said plates provided with cones and outwardly extending flanges, said ball cups provided with centrally disposed apertures for engagement with said shaft, said plates provided with centrally disposed apertures disposed for engagement with the outer peripheral surface of said ball cups, the cones of said plates provided with slots extending outward from said aperture, said plates further provided with keys extending at right angle to said plates at the edge of the aperture in said cones, said keys registering with and engaging the slots in the flange of said ball cups and the slots in said plates, said keys being of a length sufficient to enable their depending ends to be spread apart away from the outer surface of said ball cups for locking said ball cups within the cones of said plates, and an annular tire member disposed between said plates over the cones, said tire member of a diameter greater than the outer diameter of said plates.

ERVIN O. LONZE.

REFERENCES CITED

The following references are of record in the file of this patent:

UNITED STATES PATENTS

| Number | Name | Date |
| --- | --- | --- |
| 1,469,344 | Ware | Oct. 2, 1923 |
| 1,627,561 | Joslin | May 10, 1927 |